5 Sheets—Sheet 1.
B. B. HAWSE.
FURROW-GAGE.
No. 183,162. Patented Oct. 10, 1876.
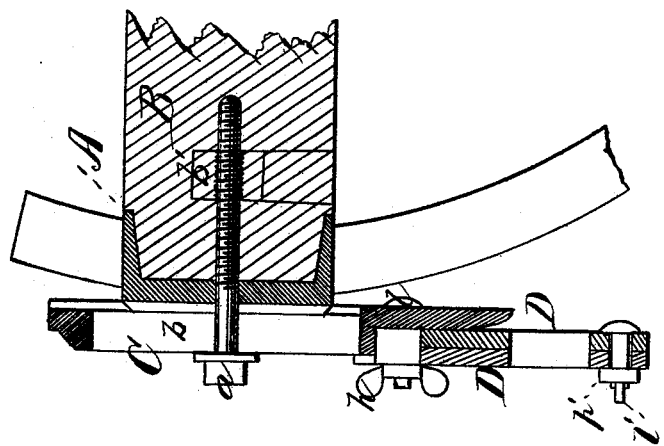
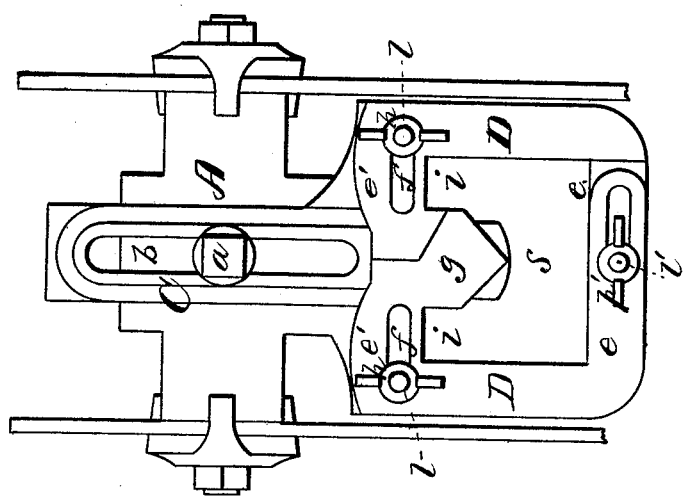
WITNESSES
INVENTOR
Benjamin B. Hawse,
Chipman Hosmer
ATTORNEYS.
THE GRAPHIC CO. N.Y.

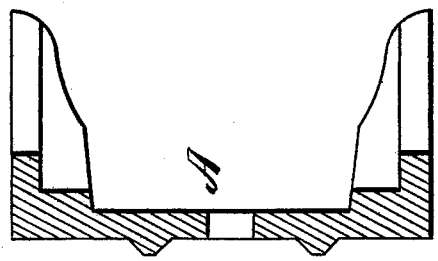
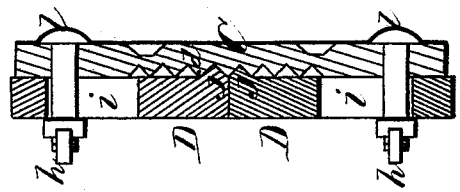
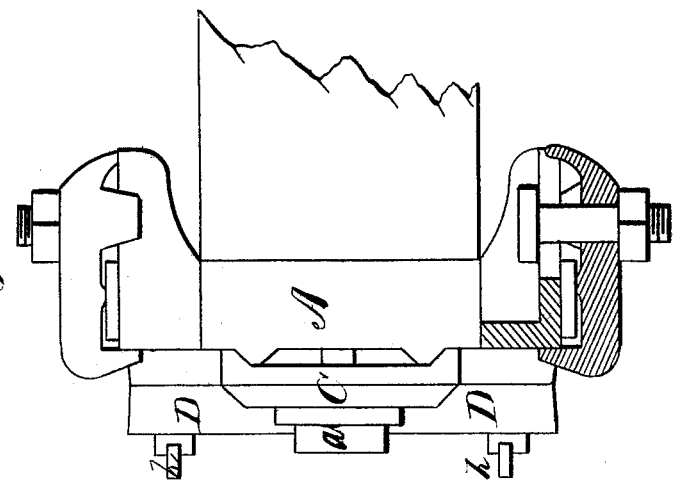

5 Sheets—Sheet 3.
B. B. HAWSE.
FURROW-GAGE.
No. 183,162. Patented Oct. 10, 1876.
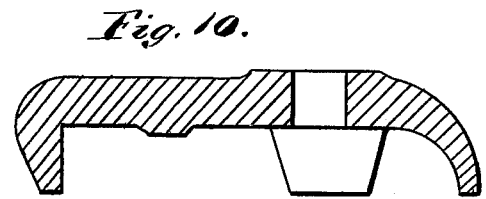
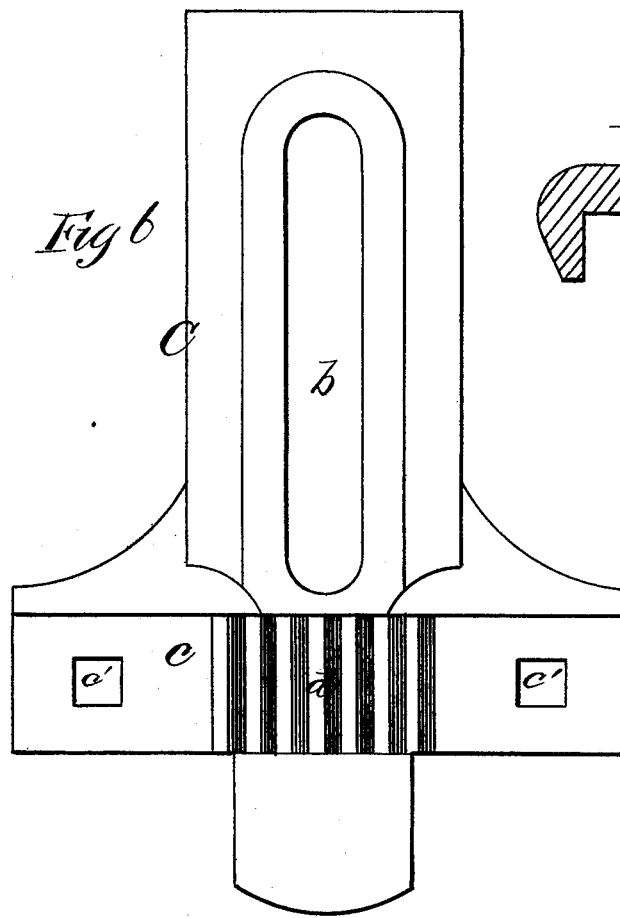
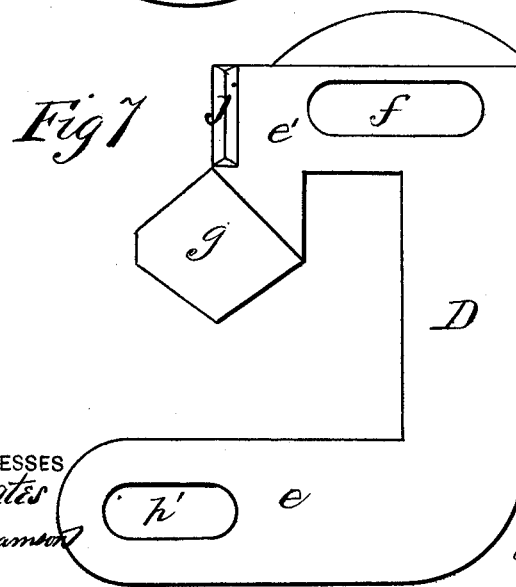
WITNESSES
E. H. Bates
E. W. Adamson
INVENTOR
Benjamin B. Hawse
Chipman Hosmer &c
ATTORNEYS
THE GRAPHIC CO. N.Y.

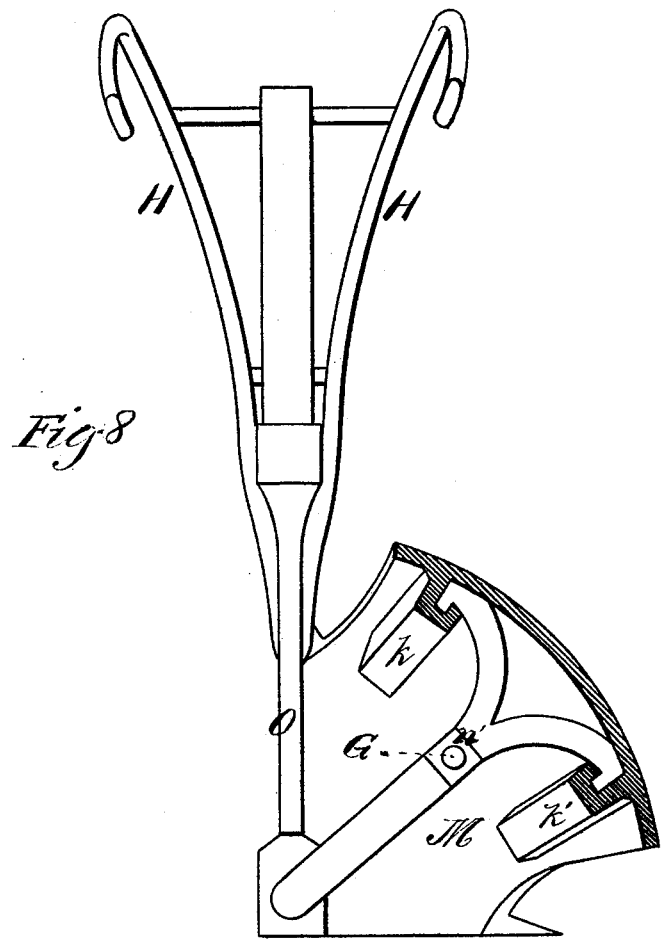

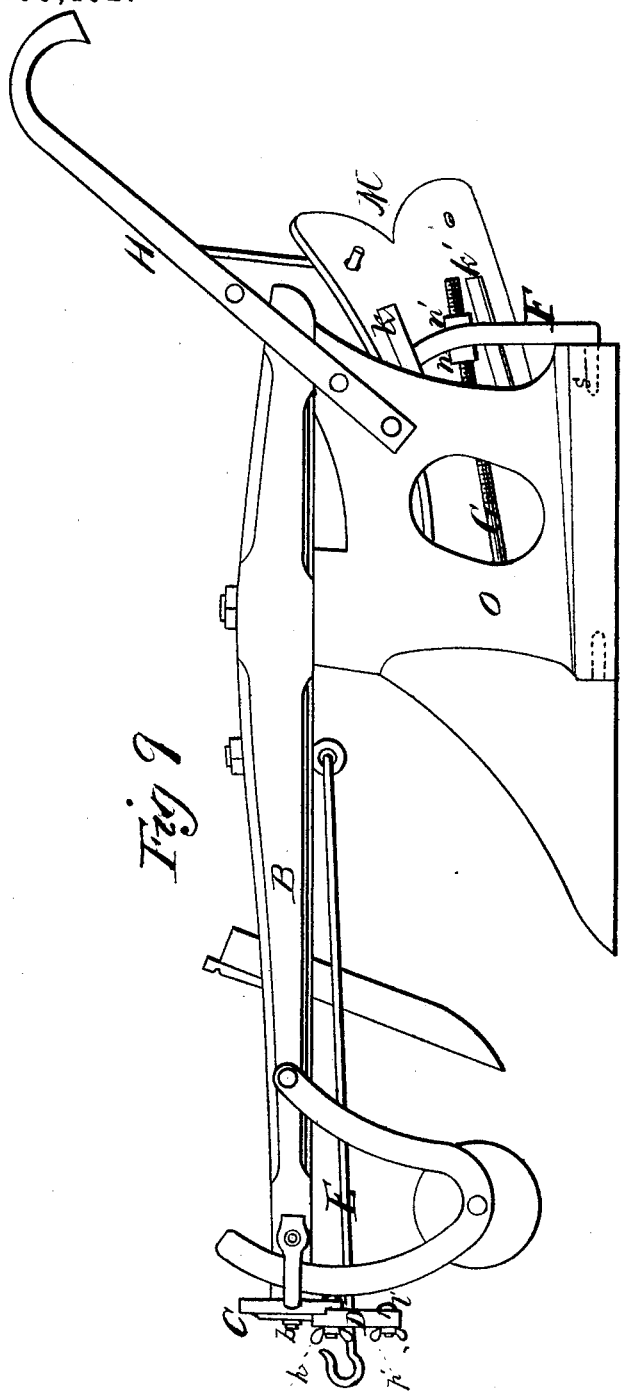

UNITED STATES PATENT OFFICE.

BENJAMIN B. HAWSE, OF MORRISVILLE, VERMONT.

IMPROVEMENT IN FURROW-GAGES.

Specification forming part of Letters Patent No. 183,162, dated October 10, 1876; application filed September 20, 1875.

*To all whom it may concern:*

Be it known that I, B. B. HAWSE, of Morrisville, in the county of Lamoille and State of Vermont, have invented a new and valuable Improvement in Adjustable Furrow-Gage and Mold-Board Brace; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my device, and Fig. 2 is a vertical sectional view thereof. Fig. 3 is a horizontal sectional view, and Figs. 4, 5, 6, and 7 are detail views. Fig. 8 is an end view, part sectional, of my plow, and Fig. 9 is a side view thereof. Fig. 10 is a detail view.

This invention has relation to plows, which are designed both for flat land and hill-side; and my objects are, first, to keep the cutter and share always in the same line, whatever may be the width of furrow, by landing at the draft-line; second, to provide for landing with any length of evener by a simple adjustment of the gage; third, to provide for properly landing to any slope of a hill without tilting the plow laterally; fourth, to provide for adjusting the gage, more or less, to one side of the central line of the beam and maintaining a fixed position for the draft-rod while the team is drawing the plow, at the same time allowing said rod to be changed from side to side by moving the plow-handles and slackening the draft-chain, all of which will be hereinafter explained.

In the annexed drawings, A designates a cast-metal ferrule, which is secured upon the front end of a plow-beam, B, in the usual well-known manner by means of a strong bolt, $a$, passing through a blind-nut, $b'$, recessed into the beam. This bolt also passes through a slot, $b$, in a cruciform hanger, C, the ends of the cross-arm $c$ of which are provided with square apertures $c'$, and the middle portion with a series of serrations or teeth, $d$. By means of slot $b$ and bolt $a$ the hanger is made vertically adjustable, the serrations being adapted to a purpose which will appear hereinafter. D represents the sections of my improved gage, which may be of any suitable metal, and are, in their general appearance, of the shape of the letter U, having a long arm, $e$, and a short arm, $e'$. The short arms $e'$ of these gages are provided each with a slot, $f$, and with an offset, $g$, projecting toward the long arm $e'$, which latter have also slots $h'$, which slots are adapted to register with each other, for a purpose hereinafter to be explained.

In practice the under side of offset $g$ in one section of the gage and the upper side in the other section will be rabbeted, as will also be the corresponding surfaces of the long arms $e'$ of the same, so that when the two parts are laid the one upon the other the corresponding surfaces of each section will be flush with each other and present a neat workmanlike appearance. Sections D are secured adjustably to the cross-arm of the cruciform hanger C by means of a bolt, $l$, which passes through apertures $c'$ therein into and through slot $f$, and are secured in position by means of a thumb-nut, $h$, the long arms $e'$ of the said sections being secured together by a similar bolt, $l'$, and a thumb-nut, $p'$. By loosening these nuts sections D of the gage may be adjusted to or from each other, as the necessities of the case may require. These sections, when applied as above described, to the hanger, form an open space, $s$, through which a pivoted or swinging draft-hook, E, projects sufficiently to allow of the application thereto of an evener or double-tree, and a recess, $i$, is formed by offsets $g$ at each side and at the upper part of this opening, as shown in Fig. 1. In these recesses the draft-rod E is adapted to be thrown and held, so that in using a reversible hill-side plow a means is provided for "landing," as it is technically called, in the following manner, to wit: The plow being reversed at the end of a furrow, the operator will bear down upon the handles H, thus allowing the hook to fall out of one recess, $i$; then by giving a slight turn and starting the team it will fall into the other recess, thus landing upon the return and keeping the cutter and share in line one with the other. When, for any cause it becomes necessary to take more land, loosen thumb-nuts $p'$ $h$ on bolts $l$ $l'$ and draw sections D apart, and again set up the nuts. This will allow the draft-hook to vibrate to a greater distance to one side of the central line of the beam, and thus produce the desired result. In order that this adjustment may be had evenly and equally for each of the sections, they are each provided with a tooth, $j$, adapted to engage with teeth or serrations $d$ on the hanger, thus easily and regularly producing the desired result.

In practice in breaking up hill-side land of unusual steepness, it is preferable to hitch the team "tandem," in order that the animals may walk in the furrow, and thereby prevent undue tendency to sweeping down hill. The effect of this is to cause a very narrow furrow, even when the mold-board is landed to the full extent which the above-described sectional gages D will admit of. I have, therefore, devised the following additional means for taking more land: The rear bifurcated brace F, whereby the mold-board M is pivoted to the fixed land-side O, in lieu of being secured rigidly to the former, is attached thereto by having its ends engaged under guides $k$ $k'$, which are attached to the said mold-board, which latter and the share are allowed to have a slight horizontal vibration to and from the land-side. Brace F is operated to throw the mold-board out from or draw it in toward the land-side by means of a rod, G, passing through it and hooked into the mold-board, this effect being produced by means of nuts $n$ $n'$ applied upon its screw-threaded end at each side of the said brace. By this means the plow, in addition to the landing obtained by the direct draft, is capable of being still further landed by throwing the mold-board and share out from the land-side, thus providing means for cutting a large broad furrow under any circumstances.

What I claim as new, and desire to secure by Letters Patent, is—

1. The draft-plate or hanger C, placed vertically on the end of a plow-beam, having the lateral slots $s$ and the vertical slots $i$ $i$, substantially as described, and for the purpose set forth.

2. The draft-rod regulator, composed of the vertically-slotted plate C, and the laterally-adjustable parts D D forming the laterally-extensible slot $s$ and the vertical slots $i$ $i$, substantially as described, and for the purpose set forth.

In testimony that I claim the above I have hereunto subscribed my name in the presence of two witnesses.

BENJAMIN B. HAWSE.

Witnesses:
WALTER C. MASI,
B. HERBERT MORSE.